(12) United States Patent
Min et al.

(10) Patent No.: US 12,079,544 B2
(45) Date of Patent: *Sep. 3, 2024

(54) DISPLAY DEVICE AND SYSTEM COMPRISING SAME

(71) Applicant: LG ELECTRONICS INC., Seoul (KR)

(72) Inventors: Sunki Min, Seoul (KR); Kiwoong Lee, Seoul (KR); Hyangjin Lee, Seoul (KR); Jeean Chang, Seoul (KR); Seunghyun Heo, Seoul (KR); Jaekyung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/214,396

(22) Filed: Jun. 26, 2023

(65) Prior Publication Data

US 2023/0350639 A1  Nov. 2, 2023

Related U.S. Application Data

(63) Continuation of application No. 17/146,287, filed on Jan. 11, 2021, now Pat. No. 11,704,089, which is a continuation of application No. 16/923,446, filed on Jul. 8, 2020, now Pat. No. 10,901,690, which is a continuation of application No. PCT/KR2018/000372, filed on Jan. 8, 2018.

(51) Int. Cl.
*G06F 3/16* (2006.01)
*H04N 21/422* (2011.01)

(52) U.S. Cl.
CPC ....... *G06F 3/167* (2013.01); *H04N 21/42204* (2013.01)

(58) Field of Classification Search
CPC .......................... H04N 21/42204; G06F 3/167
See application file for complete search history.

(56) References Cited

U.S. PATENT DOCUMENTS

2013/0339020 A1* 12/2013 Heo ................... H04N 21/6581
704/254
2014/0006022 A1* 1/2014 Yoon .............. H04N 21/234336
704/235

(Continued)

OTHER PUBLICATIONS

European Patent Office Application Serial No. 23216984.7, Search Report dated Mar. 22, 2024, 4 pages.

*Primary Examiner* — Mulugeta Mengesha
(74) *Attorney, Agent, or Firm* — LEE, HONG, DEGERMAN, KANG & WAIMEY

(57) ABSTRACT

A display device according to an embodiment of the present invention may comprise: a display unit for displaying a content image; a microphone for receiving voice commands from a user; a network interface unit for communicating with a natural language processing server and a search server; and a control unit for transmitting the received voice commands to the natural language processing server, receiving intention analysis result information indicating the user's intention corresponding to the voice commands from the natural language processing server, and performing a function of the display device according to the received intention analysis result information.

14 Claims, 11 Drawing Sheets

(56) References Cited

U.S. PATENT DOCUMENTS

| | | | |
|---|---|---|---|
| 2014/0095176 A1* | 4/2014 | Kim | H04N 21/6543 704/275 |
| 2014/0195230 A1 | 7/2014 | Han et al. | |
| 2014/0195244 A1* | 7/2014 | Cha | H04N 21/233 704/270.1 |
| 2016/0227261 A1 | 8/2016 | Neumeier et al. | |
| 2018/0358007 A9* | 12/2018 | Chae | G10L 15/22 |
| 2021/0056969 A1* | 2/2021 | Yun | G08C 17/02 |

\* cited by examiner

DISPLAY DEVICE AND SYSTEM COMPRISING SAME

CROSS-REFERENCE TO RELATED APPLICATIONS

This application is a continuation of U.S. patent application Ser. No. 17/146,287, filed on Jan. 11, 2021, which is a continuation of U.S. patent application Ser. No. 16/923,446, filed on Jul. 8, 2020, now U.S. Pat. No. 10,901,690, which is a continuation of International Application No. PCT/KR2018/000372, filed on Jan. 8, 2018, the contents of which are all incorporated by reference herein in their entirety.

TECHNICAL FIELD

The present disclosure relates to a display device and a system including the display device.

BACKGROUND ART

Digital TV services using wired or wireless communication networks are becoming common. Digital TV service may provide a variety of services that could not be provided in the conventional analog broadcasting service.

For example, IPTV (Internet Protocol Television), which is a type of digital TV service, and smart TV service provide bidirectionality that allows a user to actively select a type of viewing program and a viewing time. IPTV and smart TV services may provide a variety of additional services, such as Internet search, home shopping, and online games based on such bidirectionality.

The function of the TV has not only basic functions such as channel change and volume change but also functions associated with information on programs.

When a display device simultaneously provides a function associated with information on a program and a basic function according to a voice command of a user, the voice command may be configured in a complex form.

Further, when a voice command for requesting even a function for requesting information suiting a user's personal preference is received, it is difficult for a display device to process a user's request.

INVENTION

Technical Problem

An object of the present disclosure is to control operation of a display device by processing a voice command for requesting information on a program or information suiting a user's personal preference.

Technical Solution

A display device according to an embodiment of the present disclosure includes a display configured to display a content image, a microphone configured to receive a voice command of a user, a network interface configured to perform communication with a natural language processing server and a search server, and a controller configured to transmit the received voice command to the natural language processing server, receive intention analysis result information indicating an intention of the user corresponding to the voice command from the natural language processing server, and perform a function of the display device according to the received intention analysis result information.

A system according to an embodiment of the present disclosure includes a natural language processing server configured to generate intention analysis result information indicating a result of analyzing an intention of a voice command, and a display device configured to transmit the voice command to the natural language processing server, receive the intention analysis result information corresponding to the voice command from the natural language processing server and perform a function of the display device suiting the intention according to the received intention analysis result information.

Effect of the Invention

According to various embodiments of the present invention, even when a complicated voice command associated with information on a program or information suiting a user's personal preference, it is possible to efficiently process the voice command and provide more improved services to a user.

BEST MODE

Figure 1:
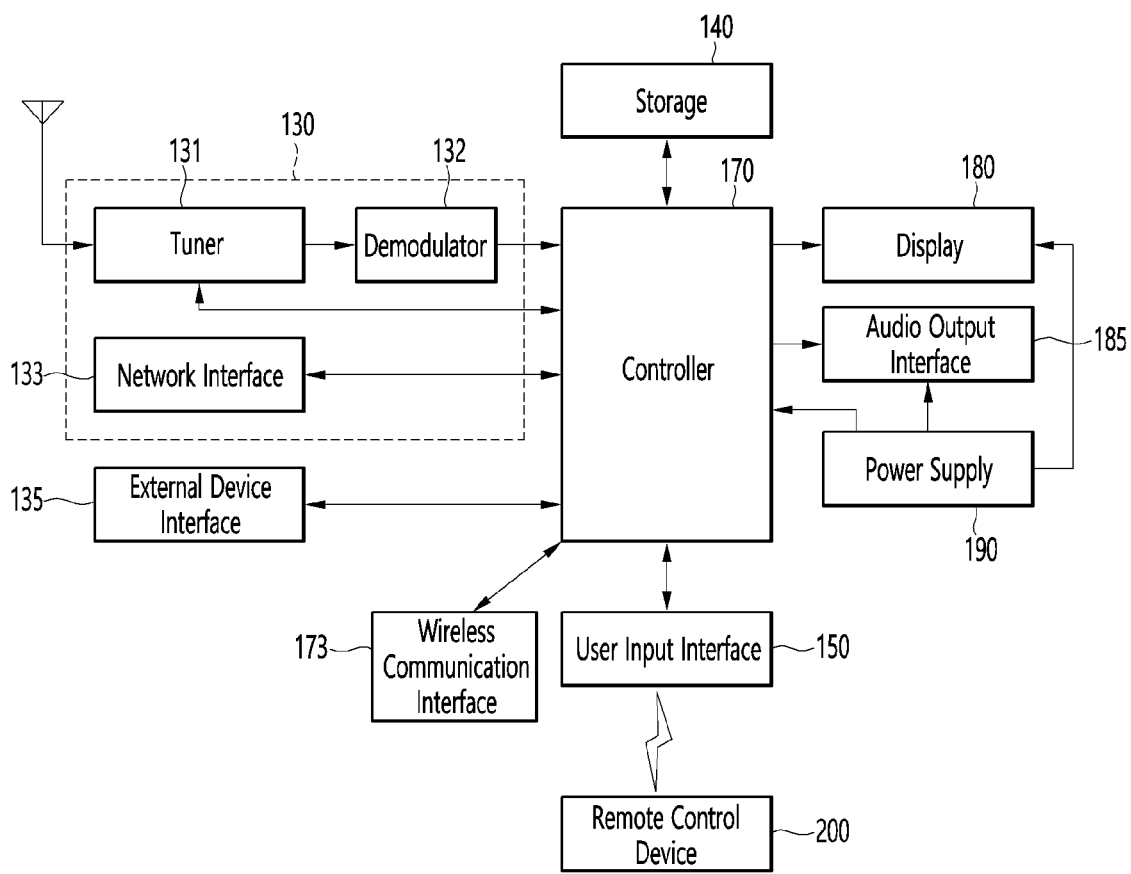
FIG. 1 is a block diagram illustrating a configuration of a display device according to an embodiment of the present disclosure.

Hereinafter, the configuration and operation according to the present disclosure will be described in detail with reference to the accompanying drawings. In the description with reference to the accompanying drawings, the same components are given the same reference numerals, and a repeated description thereof will be omitted. Terms such as first and second may be used to describe various components, but the components should not be limited by the terms. The terms are used only for the purpose of distinguishing one component from other components.

Hereinafter, embodiments relating to the present disclosure will be described in detail with reference to the accompanying drawings. The suffixes "module" and "interface" for components used in the description below are assigned or mixed in consideration of easiness in writing the specification and do not have distinctive meanings or roles by themselves.

A display device according to an embodiment of the present disclosure, for example, as an artificial display device that adds a computer supporting function to a broadcast receiving function, can have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS can be used.

Accordingly, since various apps are freely added or deleted on a general purpose OS kernel, a display device described herein, for example, can perform various user-friendly functions. The display device, in more detail, can be a network TV, Hybrid Broadcast Broadband TV (HBBTV), smart TV, light-emitting diode (LED) TV, organic light-emitting diode (OLED) TV, and so on and in some cases, can be applied to a smartphone.

FIG. 1 is a block diagram illustrating a configuration of a display device according to an embodiment of the present disclosure.

Referring to FIG. 1, a display device 100 can include a broadcast receiver 130, an external device interface 135, a storage 140, a user input interface 150, a controller 170, a wireless communication interface 173, a display 180, an audio output interface 185, and a power supply 190.

The broadcast receiver 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The external device interface 135 can receive an app or an app list in an adjacent external device and deliver it to the controller 170 or the storage 140.

The external device interface 135 can provide a connection path between the display device 100 and an external device. The external device interface 135 can receive at least one an image or audio output from an external device that is wirelessly or wiredly connected to the display device 100 and deliver it to the controller 170. The external device interface 135 can include a plurality of external input terminals. The plurality of external input terminals can include an RGB terminal, at least one High Definition Multimedia Interface (HDMI) terminal, and a component terminal.

An image signal of an external device input through the external device interface 135 can be output through the display 180. A voice signal of an external device input through the external device interface 135 can be output through the audio output interface 185.

An external device connectable to the external device interface 135 can be one of a set-top box, a Blu-ray player, a DVD player, a game console, a sound bar, a smartphone, a PC, a USB Memory, and a home theater system, but this is just exemplary.

The network interface 133 can provide an interface for connecting the display device 100 to a wired/wireless network including the Internet network. The network interface 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface 133 can access a predetermined webpage through an accessed network or another network linked to the accessed network. In other words, the network interface 133 can transmit or receive data to or from a corresponding server by accessing a predetermined webpage through the network.

Then, the network interface 133 can receive contents or data provided from a content provider or a network operator. In other words, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an Internet or content provider or a network operator.

The network interface 133 can select and receive a desired app among apps open to the air, through network.

The storage 140 can store signal-processed image, voice, or data signals stored by a program in order for each signal processing and control in the controller 170.

Additionally, the storage 140 can perform a function for temporarily storing image, voice, or data signals output from the external device interface 135 or the network interface 133 and can store information on a predetermined image through a channel memory function.

The storage 140 can store an app or an app list input from the external device interface 135 or the network interface 133.

The display device 100 can play content files (for example, video files, still image files, music files, document files, app files, and so on) stored in the storage 140 and provide them to a user.

The user input interface 150 can deliver signals input by a user to the controller 170 or deliver signals from the controller 170 to a user. For example, the user input interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface 150 can deliver, to the controller 170, control signals input from local keys (not illustrated) such as a power key, a channel key, a volume key, and a setting key.

Image signals that are image-processed in the controller 170 can be input to the display 180 and displayed as an image corresponding to corresponding image signals. Additionally, image signals that are image-processed in the controller 170 can be input to an external output device through the external device interface 135.

Voice signals processed in the controller 170 can be output to the audio output interface 185. Additionally, voice signals processed in the controller 170 can be input to an external output device through the external device interface 135.

Besides that, the controller 170 can control overall operations in the display device 100. Additionally, the controller 170 can control the display device 100 by a user command or internal program input through the user input interface 150 and download a desired app or app list into the display device 100 in access to network.

The controller 170 can output channel information selected by a user together with processed image or voice signals through the display 180 or the audio output interface 185.

Additionally, according to an external device image playback command received through the user input interface 150, the controller 170 can output image signals or voice signals of an external device such as a camera or a camcorder, which are input through the external device interface 135, through the display 180 or the audio output interface 185.

Moreover, the controller 170 can control the display 180 to display images and control broadcast images input through the tuner 131, external input images input through the external device interface 135, images input through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content input from the outside, and the content can be in various formats such as broadcast images, external input images, audio files, still images, accessed web screens, and document files.

The wireless communication interface 173 can perform a wired or wireless communication with an external electronic device. The wireless communication interface 173 can perform short-range communication with an external device. For this, the wireless communication interface 173 can support short-range communication by using at least one of Bluetooth™, Radio Frequency Identification (RFID), Infrared Data Association (IrDA), Ultra Wideband (UWB), Zig-Bee, Near Field Communication (NFC), Wireless-Fidelity (Wi-Fi), Wi-Fi Direct, and Wireless Universal Serial Bus (USB) technologies. The wireless communication interface 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication interface 173. Accordingly, a user of the wearable device can use the data processed in the display device 100 through the wearable device.

The display 180 can convert image signals, data signals, or on-screen display (OSD) signals, which are processed in the controller 170, or images signals or data signals, which are received in the external device interface 135, into R, G, and B signals to generate driving signals.

Meanwhile, the display device 100 illustrated in FIG. 1 is just one embodiment of the present disclosure and thus, some of the components illustrated can be integrated, added, or omitted according to the specification of the actually implemented display device 100.

In other words, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents input from the image processing device.

In this case, an operating method of a display device according to an embodiment of the present disclosure described below can be performed by one of the display device described with reference to FIG. 1, an image processing device such as the separated set-top box, and a content playback device including the display 180 and the audio output interface 185.

Figure 2:
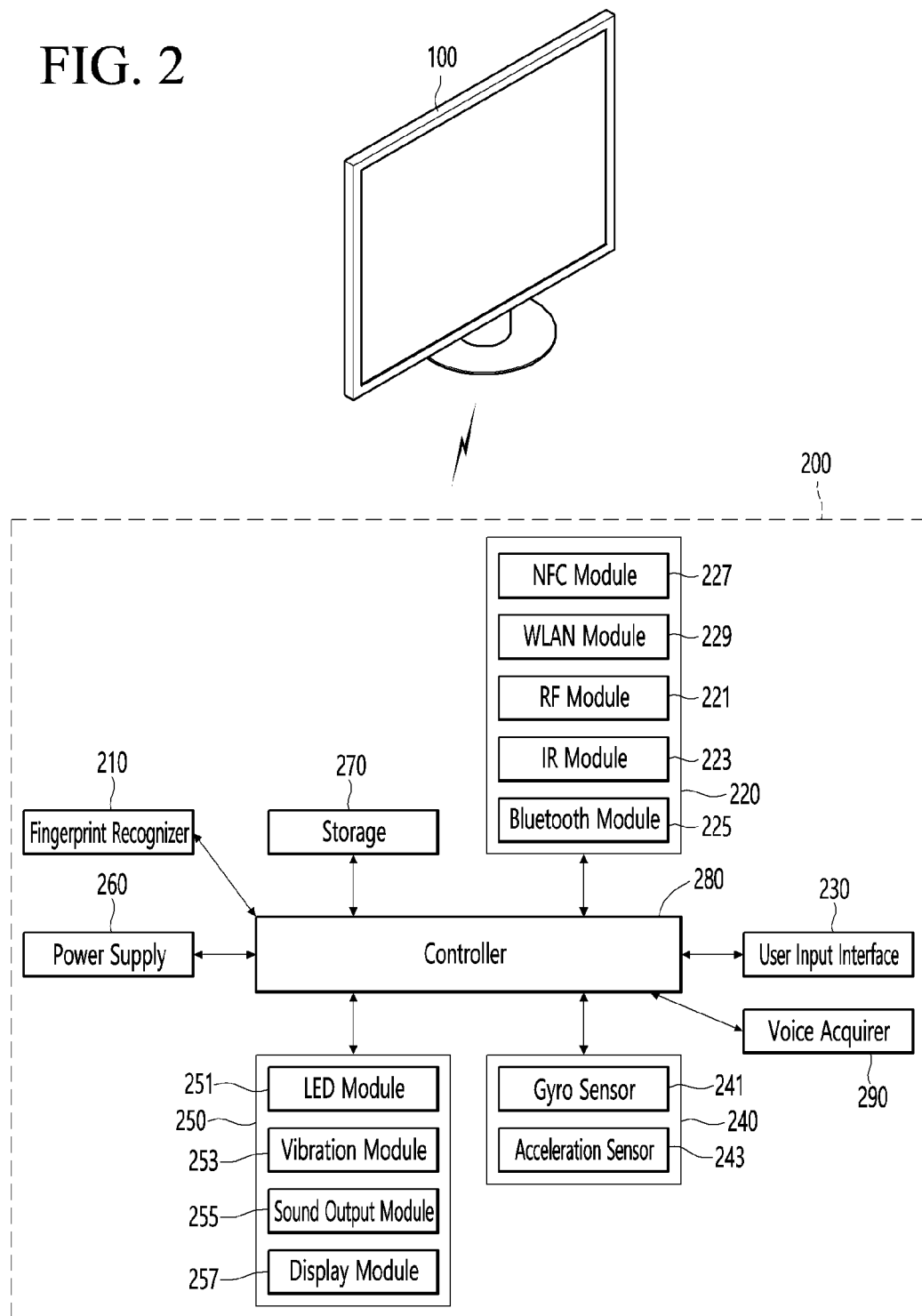
FIG. 2 is a block diagram illustrating a remote control device according to an embodiment of the present disclosure.
Figure 3:
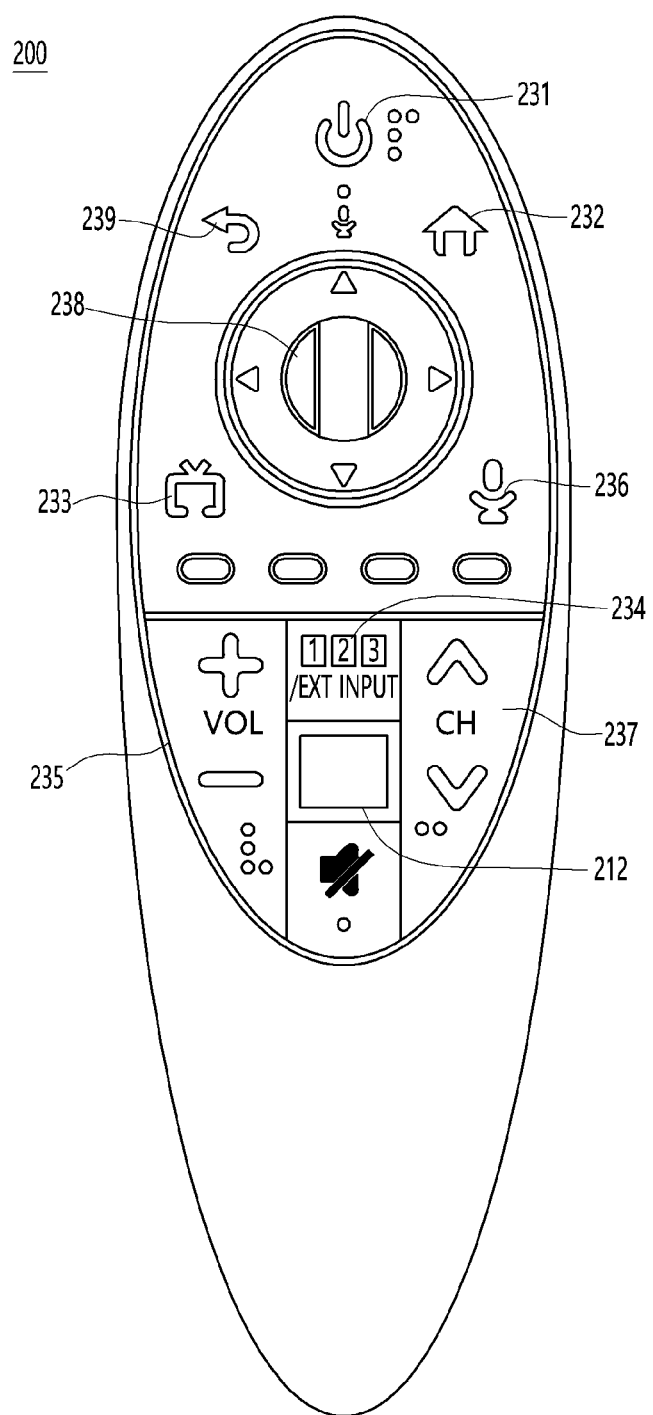
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device 200 according to an embodiment of the present disclosure.

First, referring to FIG. 2, a remote control device 200 can include a fingerprint recognizer 210, a wireless communication interface 220, a user input interface 230, a sensor 240, an output interface 250, a power supply 260, a storage 270, a controller 280, and a voice acquirer 290.

Referring to FIG. 2, the wireless communication interface 220 transmits/receives signals to/from an arbitrary any one of display devices according to the above-mentioned embodiments of the present disclosure.

The remote control device 200 can include a radio frequency (RF) module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include a Near Field Communication (NFC) module 227 for transmitting/receiving signals to/from the display device 100 according to the NFC communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication interface 220.

Moreover, the remote control device 200 can receive signals transmitted from the display device 100 through the RF module 221 and if necessary, can transmit a command on power on/off, channel change, and volume change to the display device 100 through the IR module 223.

The user input interface 230 can be configured with a keypad button, a touch pad, or a touch screen. A user can manipulate the user input interface 230 to input a command relating to the display device 100 to the remote control device 200. If the user input interface 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The home button 232 can be a button for moving to the home screen of the display device 100. The live button 233 can be a button for displaying live broadcast programs. The external input button 234 can be a button for receiving an external input connected to the display device 100. The voice adjustment button 235 can be a button for adjusting the size of a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

FIG. 2 will be described again.

If the user input interface 230 includes a touch screen, a user can touch a soft key of the touch screen to input a command relating to the display device 100 to the remote control device 200. Additionally, the user input interface 230 can include various kinds of input means manipulated by a user, for example, a scroll key and a jog key, and this embodiment does not limit the scope of the present disclosure.

The sensor 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display 180 of the display device 100.

The output interface 250 can output image or voice signals corresponding to manipulation of the user input interface 235 or corresponding to signals transmitted from the display device 100. A user can recognize whether the user input interface 235 is manipulated or the display device 100 is controlled through the output interface 250.

For example, the output interface 250 can include an LED module 251 for flashing, a vibration module 253 for generating vibration, a sound output module 255 for outputting sound, or a display module 257 for outputting an image, if the user input interface 235 is manipulated or signals are transmitted/received to/from the display device 100 through the wireless communication interface 220.

Additionally, the power supply 260 supplies power to the remote control device 200 and if the remote control device 200 does not move for a predetermined time, stops the power supply, so that power waste can be reduced. The power supply 260 can resume the power supply if a predetermined key provided at the remote control device 200 is manipulated.

The storage 270 can store various kinds of programs and app data necessary for control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage 270, information on a frequency band for transmitting/receiving signals to/from the display device 100 paired with the remote control device 200 and refer to it.

The controller 280 controls general matters relating to control of the remote control device 200. The controller 280 can transmit a signal corresponding to a predetermined key manipulation of the user input interface 235 or a signal corresponding to movement of the remote control device 200 sensed by the sensor 240 to the display device 100 through the wireless communication interface 220.

Additionally, the voice acquirer 290 of the remote control device 200 can obtain voice.

The voice acquirer 290 can include at least one microphone 291 and obtain voice through the microphone 291.

Figure 4:
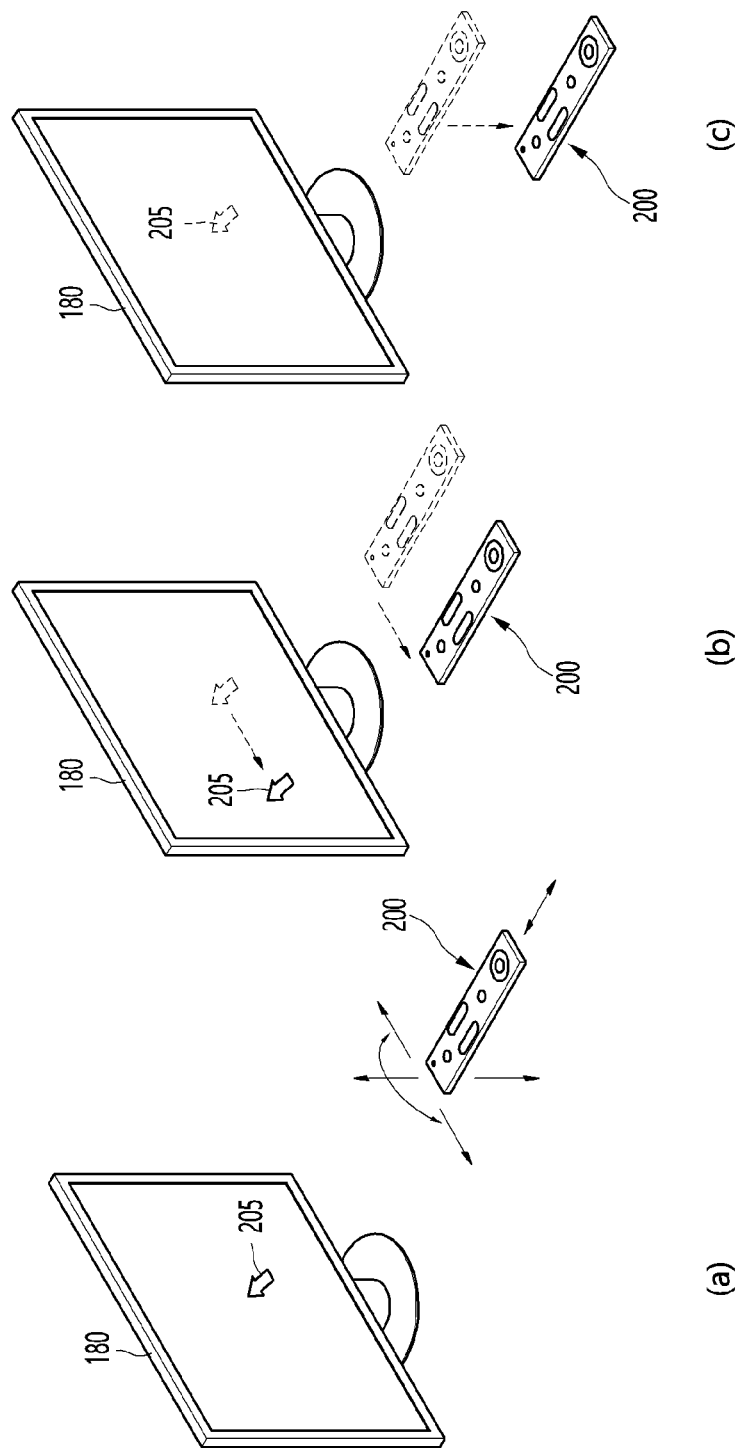
FIG. 4 is a view of utilizing a remote control device according to an embodiment of the present disclosure.

Next, FIG. 4 is illustrated.

FIG. 4 is a view of utilizing a remote control device according to an embodiment of the present disclosure.

FIG. 4(a) illustrates that a pointer 205 corresponding to the remote control device 200 is displayed on the display 180.

A user can move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote control device.

FIG. 4(b) illustrates that if a user moves the remote control device 200, the pointer 205 displayed on the display 180 of the display device 100 is moved to the left according to the movement of the remote control device 200.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(*c*) illustrates that while a specific button in the remote control device 200 is pressed, a user moves the remote control device 200 away from the display 180. Thus, a selection area in the display 180 corresponding to the pointer 205 can be zoomed in and displayed larger.

On the contrary, when the user moves the remote control device 200 to approach the display 180, the selection area in the display 180 corresponding to the pointer 205 may be zoomed out and reduced.

On the other hand, if the remote control device 200 is moved away from the display 180, a selection area can be zoomed out and if the remote control device 200 is moved closer to the display 180, a selection area can be zoomed in.

Additionally, if a specific button in the remote control device 200 is pressed, recognition of a vertical or horizontal movement can be excluded. In other words, if the remote control device 200 is moved away from or closer to the display 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display 180 in response to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

Figure 5:
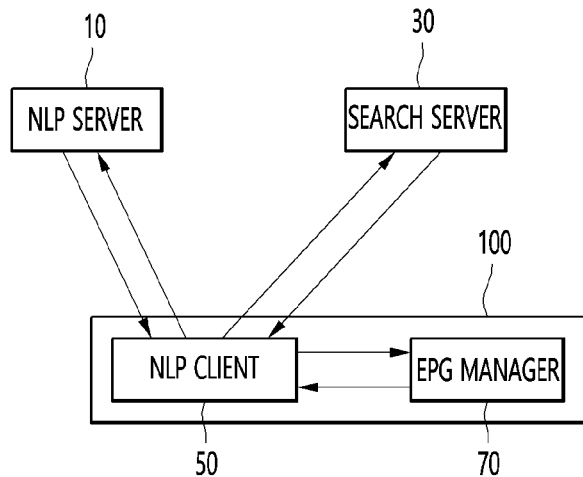
FIG. 5 is a block diagram illustrating a configuration of a system according to an embodiment of the present disclosure.

FIG. 5 is a block diagram illustrating a configuration of a system according to an embodiment of the present disclosure.

Referring to FIG. 5, the system according to the embodiment of the present disclosure may include a natural language process (NLP) server 10, a search server 30 and a display device 100.

The NLP sever 10 may perform intention analysis based on voice data received from the display device 100. The NLP sever 10 may transmit intention analysis result information indicating a result of performing intention analysis to the display device 100.

The search server 30 may receive an information request message for requesting search of information from the display device 100.

The search server 30 may search for specific information based on an information request message and transmit the searched search information to the display device 100.

The display device 100 may further include an NLP client 50 and an EPG manager 70 in addition to the components described in FIG. 1.

In another example, the NLP client 50 and the EPG manager 70 may be included in the configuration of the controller 170.

The NLP client 50 of the display device 100 may receive a voice command of a user and transmit voice data corresponding to the received voice command to the NLP sever 10.

The NLP client 50 of the display device 100 may receive, from the NLP sever 10, intention analysis result information indicating a result of performing intention analysis with respect to the voice command.

The NLP client 50 of the display device 100 may autonomously determine whether a function corresponding to the intention of the user is able to be autonomously performed, based on the received intention analysis result information.

The NLP client 50 of the display device 100 may autonomously perform the function corresponding to the intention of the user, upon determining that the function corresponding to the intention of the user is able to be autonomously performed.

The case where it is determined that the display device 100 is able to autonomously perform the function corresponding to the intention of the user may correspond to the case where the function of the display device 100 is able to be controlled using electronic program guide (EPG) information stored in the storage 140.

The NLP client 50 of the display device 100 may request information on a program from the EPG manager 70.

The EPG manager 70 may extract the information on the program from the EPG information in response to the request and transmit the extracted information to the NLP client 50.

The NLP client 50 of the display device 100 may transmit an information request message for requesting information suiting the intention of the user to the search server 30, upon determining that the function corresponding to the intention of the user is not able to be autonomously performed.

The NLP client 50 of the display device 100 may receive an information response message responding to the information request message from the search server 30.

Figure 6:
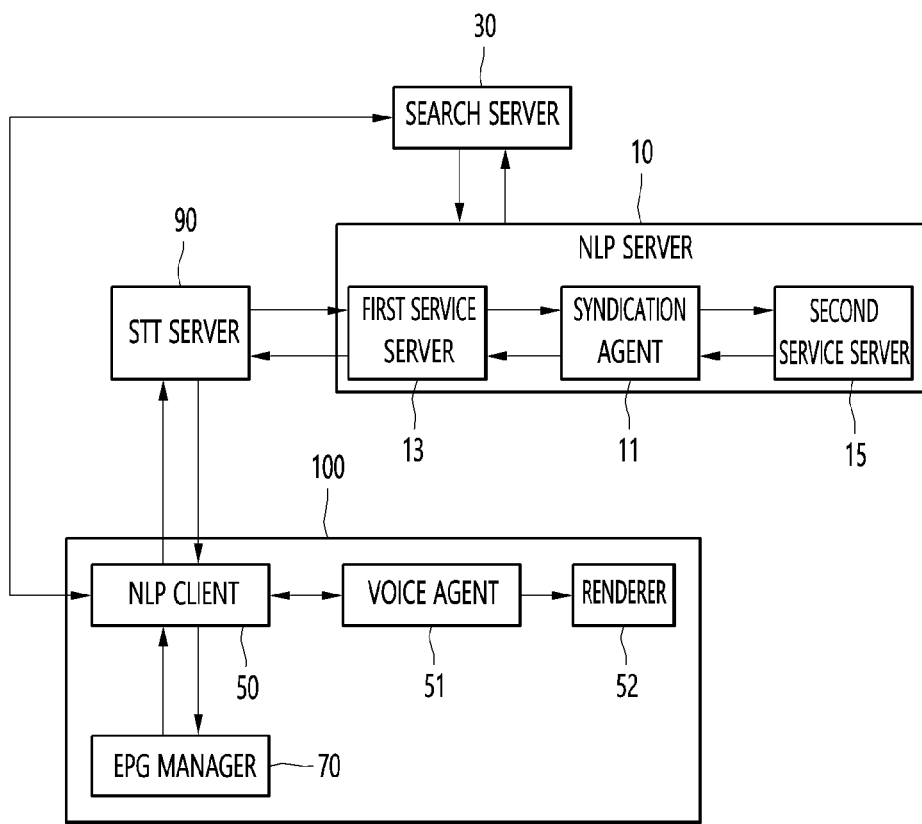
FIG. 6 is a view illustrating a detailed configuration of a system according to an embodiment of the present disclosure.

FIG. 6 is a view illustrating a detailed configuration of a system according to an embodiment of the present disclosure.

FIG. 6 is a view illustrating the detailed configuration of FIG. 5 and thus a repeated description of FIG. 5 will be omitted.

Referring to FIG. 6, the system according to the embodiment of the present disclosure may further include a speech to text (STT) server 90.

The STT server 90 may convert the voice data received from the NLP client 50 of the display device 100 into text data. The STT server 90 may transmit the converted text data to the NLP sever 10.

The NLP sever 10 may include a syndication agent 11, a first service server 13 and a second service server 15.

The syndication agent 11 may control operation of the first service server 13 and the second service server 15.

The first service server 13 may be a server for a natural language processing service provided by a manufacturer other than the manufacturer of the display device 100.

The second service server 15 may be a server for a natural language processing service provided by the manufacturer of the display device 100.

According to one embodiment, the NLP sever 10 may not include the syndication agent 11 and the first service server 13.

The display device 100 may further include a voice agent 51 and a renderer 52.

The voice agent 51 and the renderer 52 may also be included in the controller 170 described in FIG. 1.

The voice agent 51 may receive a signal for entering a voice recognition mode from the remote control device 200 and activate operation of the microphone provided in the display device 100 according to the received signal.

The voice agent 51 may transmit the voice command received from the microphone provided in the display device 100 or the voice command received from the remote control device 200 to the NLP client 50.

The voice agent 51 may receive, from the NLP client 50, the intention analysis result information or search information received from the NLP sever 10.

The voice agent 51 may execute an application or perform a function corresponding to a button key of the remote control device 200, based on the intention analysis result information.

The voice agent 51 may be included in the configuration of the NLP client 50.

The renderer 52 may generate a user interface (UI) through a GUI module in order to display the received search information on the display 180, and output the generated UI on the display 180.

Next, a method of operating a system according to an embodiment of the present disclosure will be described.

Figure 7:
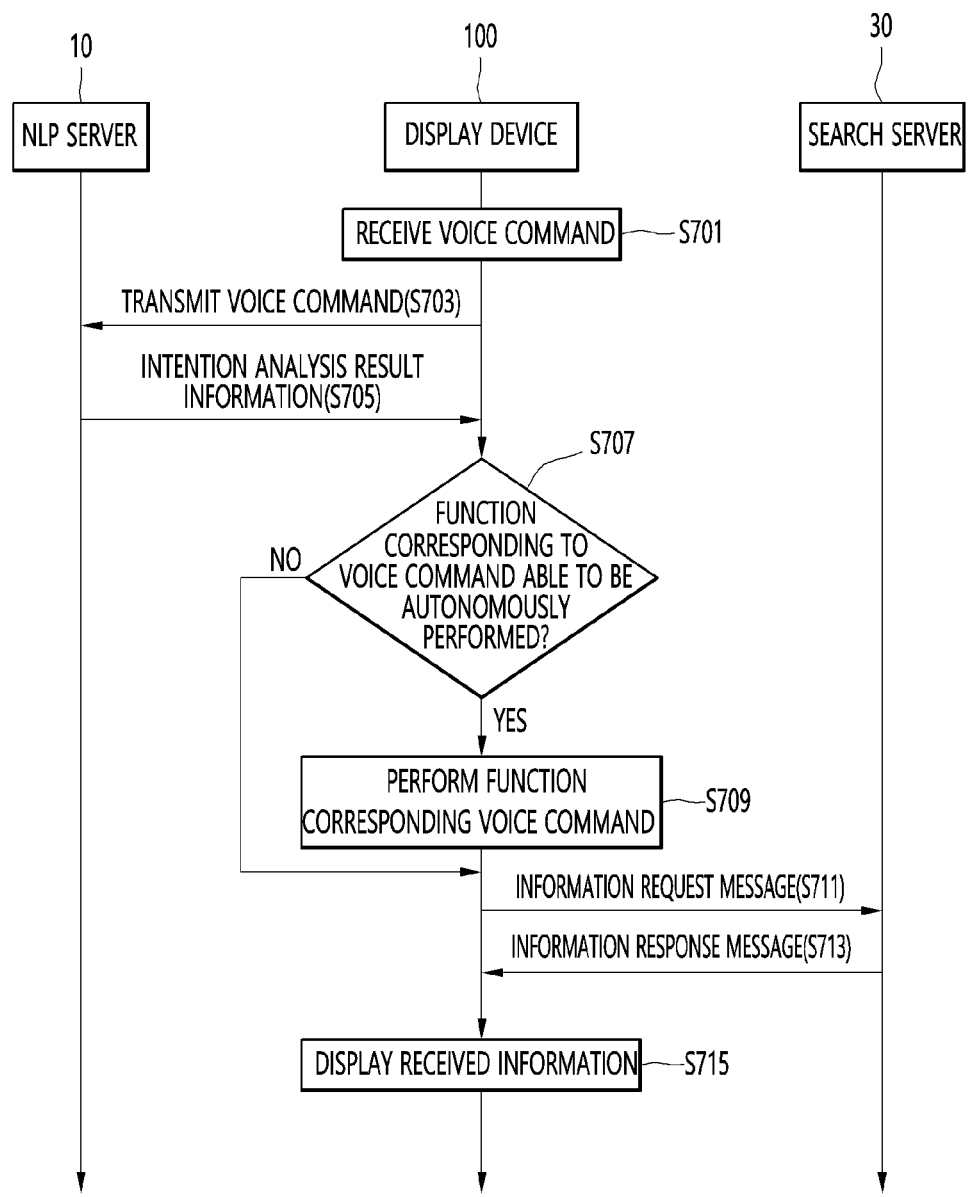
FIG. 7 is a ladder diagram illustrating a method of operating a system according to an embodiment of the present disclosure.

FIG. 7 is a ladder diagram illustrating a method of operating a system according to an embodiment of the present disclosure.

Hereinafter, the method of operating the system according to the embodiment of the present disclosure will be described with reference to FIGS. 5 and 6.

Referring to FIG. 7, the display device 100 receives a voice command (S701).

In one embodiment, the display device 100 may include a microphone and receive a voice command of a user through the microphone.

In another embodiment, the wireless communication interface 173 of the display device 100 may receive the voice command from the remote control device 200. That is, the user may utter the voice command through the remote control device 200, and the uttered voice command may be transmitted to the display device 100 through the remote control device 200.

The controller 170 of the display device 100 may have a function capable of autonomously performing natural language processing. The controller 170 may not transmit the voice data corresponding to the voice command to the NLP sever 10, when intention analysis of the received voice command is possible through the natural language processing module provided in the controller 170.

For example, when the voice command is <Turn off TV>, the controller 170 may analyze the intention of the voice command and turn off the display device 100 according to the result of analysis.

In one embodiment, when the converted text data of the voice command is stored in the storage 140, the controller 170 may autonomously perform the function of the display device 100 corresponding to the text data.

Examples of the functions of the display device 100, which may be performed by the controller 170 based on natural language processing of the voice command, may include one or more of power on/off, channel change and volume control of the display device 100.

The display device 100 transmits voice data corresponding to the received voice command to the NLP sever 10 (S703).

The controller 170 of the display device 100 may transmit the voice data corresponding to the voice command to the NLP sever 10 through the network interface 133.

The NLP sever 10 may convert the voice data received from the display device 100 into text data and perform intention analysis based on the converted text data.

The NLP sever 10 may analyze the text data according to a natural language processing technique and perform intention analysis of the user. The natural language processing technique is technique for mechanically analyzing a natural language and outputting a result in a form capable of being understood by a computer or a language capable of being understood by a human.

The display device 100 receives intention analysis result information indicating an intention analysis result of the voice data from the NLP sever 10 (S705).

The controller 170 of the display device 100 may receive the intention analysis result information through the network interface 133.

The display device 100 determines whether the function of the display device 100 corresponding to the voice command is able to be autonomously performed, based on the received intention analysis result information (S707).

In one embodiment, the controller 170 of the display device 100 may determine whether the display device 100 is able to provide the information corresponding to the voice command, based on the received intention analysis result information.

The controller 170 may determine that the function corresponding to the voice command is able to be autonomously performed, when content included in the intention analysis result information requests information stored in the display device 100.

The controller 170 may determine that the function corresponding to the voice command is not able to be autonomously performed, when content included in the intention analysis result information requests information other than the information stored in the display device 100.

The display device 100 performs the function of the display device 100 corresponding to the voice command (S709), upon determining that the function of the display device 100 corresponding to the voice command is able to be autonomously performed.

In one embodiment, when the intention of the user corresponding to the voice command is a function which may be performed using electronic program guide (EPG) information, the controller 170 may control the function of the display device 100 using the EPG information stored in the storage 140. A detailed example thereof will be described below.

Upon determining that the function of the display device 100 corresponding to the voice command is not able to be autonomously performed, the display device 100 transmits, to the search server 30, an information request message based on the intention analysis result (S711).

When the intention of the user corresponding to the voice command is a function which is not be able to be performed using the information stored in the storage 140, the controller 170 of the display device 100 may transmit an information request message to the search server 30 through the network interface 133.

The information request message may be a request message for searching for specific information reflecting the intention of the user.

The search server 30 transmits an information response message including a search result to the display device 100 in response to the information request message received from the display device 100 (S713).

The display device 100 displays the received information based on the information response message received from the search server 30 (S715).

The controller 170 of the display device 100 may display the search information reflecting the intention of the user included in the information response message on the display 180.

Hereinafter, the embodiment of FIG. 7 will be described using a more specific example.

Figure 8:
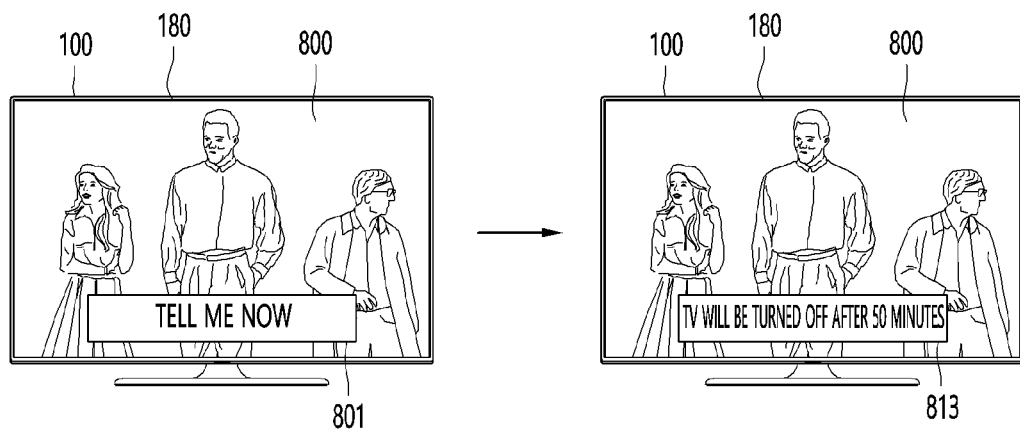
FIG. 8 is a view illustrating an example of performing a function of a display device without using a search server through intention analysis of a voice command according to an embodiment of the present disclosure.

FIG. 8 is a view illustrating an example of performing a function of a display device without using a search server through intention analysis of a voice command according to an embodiment of the present disclosure.

Referring to FIG. 8, the display device 100 may display a broadcast program image 800 on the display 180. The display 180 may further display a popup window 801 for guiding the request of the voice command of the user in a voice recognition mode.

The microphone provided in the remote control device 200 may receive a voice command <Turn off TV when this program is over> of the user.

The wireless communication interface 220 of the remote control device 200 may transmit the voice command to the wireless communication interface 173 of the display device 100.

In another embodiment, when the microphone is provided in the display device 100, the display device 100 may autonomously receive the voice command of the user.

The NLP client 50 of the display device 100 may transmit the received voice command to the NLP sever 10.

The NLP client 50 of the display device 100 may receive intention analysis result information including an intention analysis result of the voice command from the NLP sever 10.

The NLP client 50 of the display device 100 may determine whether a function according to the intention of the user is able to be performed without using the search server 30, based on the intention analysis result information.

When the intention analysis result information includes an intention to turn off the display device 100 after termination of the program which is currently being viewed, since the end point of the program may be acquired through the EPG information stored in the storage 140, the NLP client 50 of the display device 100 may determine that the function according to the intention is able to be autonomously performed.

The NLP client 50 of the display device 100 may acquire information on the program which is currently being viewed, using the EPG information, according to the intention to turn off the display device 100, after termination of the program which is currently being viewed.

The NLP client 50 of the display device 100 may request the information on the program which is currently being played from the EPG manager 70 described in FIG. 5 and acquire information on the program in response to the request.

The information on the program may include a broadcast time including a starting point and an end point of the program, a title of the program and a channel of the program.

The NLP client 50 of the display device 100 may acquire the end point of the program using the broadcast time of the program.

The NLP client 50 of the display device 100 may turn off the display device 100, when the current point reaches the end point of the program, using the acquired end point of the program.

Meanwhile, when the end point of the program is acquired, the display device 100 may display, on the display 180, a popup window 813 indicating that the display device 100 is turned off, after a certain time.

According to the embodiment of the present disclosure, it is possible to easily control operation of the display device 100, by analyzing the complicated voice command of the user.

Next, FIG. 9 will be described.

Figure 9:
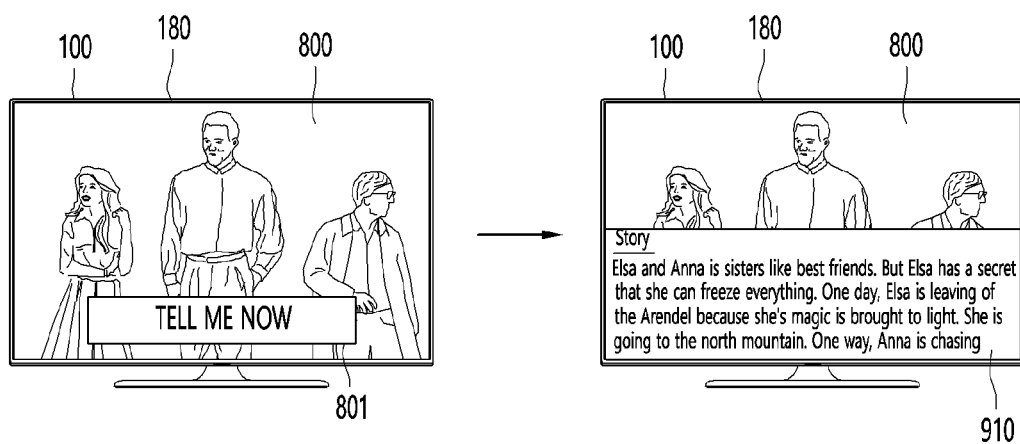
FIGS. 9 to 13 are views illustrating examples of providing search information using a search server through intention analysis of a voice command according to an embodiment of the present disclosure.
Figure 9:
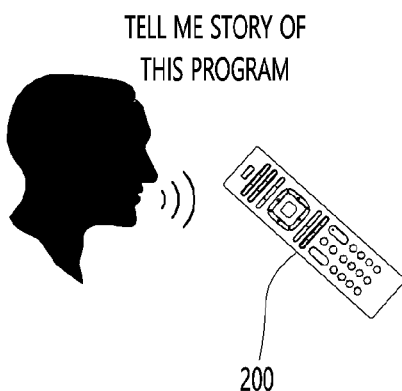

FIG. 9 is a view illustrating an example of providing search information using a search server through intention analysis of a voice command according to an embodiment of the present disclosure.

Referring to FIG. 9, the display device 100 may display the image 800 of the broadcast program on the display 180. The display 180 may further display the popup window 801 for guiding the request of the voice command of the user in the voice recognition mode. The microphone provided in the remote control device 200 may receive a voice command <Give me the story of this program> of the user.

The wireless communication interface 220 of the remote control device 200 may transmit the voice command to the wireless communication interface 173 of the display device 100.

In another embodiment, when the microphone is provided in the display device 100, the display device 100 may autonomously receive the voice command of the user.

The NLP client 50 of the display device 100 may transmit the received voice command to the NLP sever 10.

The NLP client 50 of the display device 100 may receive intention analysis result information including an intention analysis result of the voice command from the NLP sever 10.

When the intention analysis result information is an intention to give the story of the program which is currently being viewed, since the story of the program is not stored in the storage 140 (that is, in the EPG information), the NLP client 50 of the display device 100 may determine that the function according to the intention is not able to be performed.

Thereafter, the NLP client 50 of the display device 100 may transmit an information request message for requesting the story of the program to the search server 30.

The information request message may include information on the title of the program and the episode of the program. This may be obtained from the EPG information.

The search server 30 may search for the story of the program based on the information request message received from the display device 100. The search server 30 may transmit an information response message including the searched story to the display device 100.

The display device 100 may display the story 910 of the program received from the search server 30 on the display 180.

The user may easily confirm information which cannot be obtained from the EPG information, through simple voice command intention analysis.

Next, FIG. 10 will be described.

Figure 10:
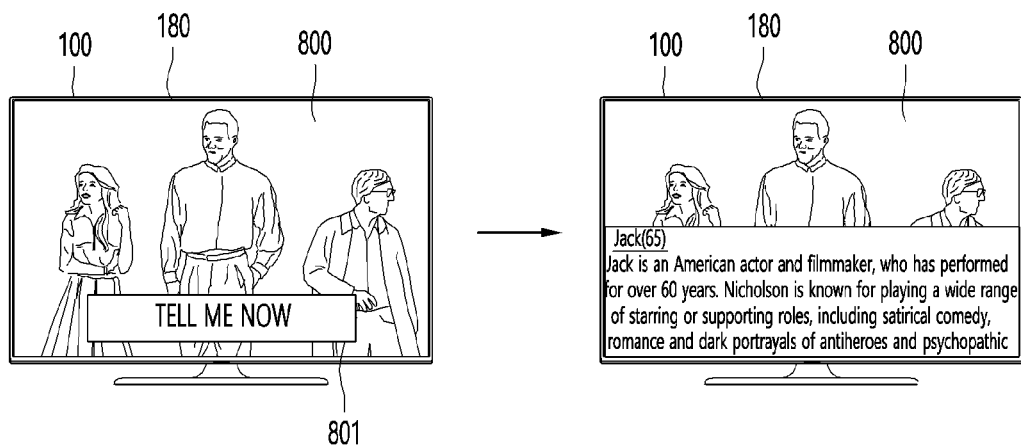
Figure 10:
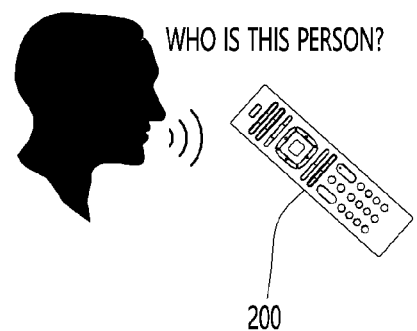

FIG. 10 is a view illustrating an example of providing search information using a search server through intention analysis of a voice command according to another embodiment of the present disclosure.

Referring to FIG. 10, the display device 100 may display the image 800 of the broadcast program on the display 180. The display 180 may further display a popup window 801 for guiding the request of the voice command of the user in the voice recognition mode.

The microphone provided in the remote control device 200 may receive a voice command <Who is this person?> of the user.

The wireless communication interface 220 of the remote control device 200 may transmit the voice command to the wireless communication interface 173 of the display device 100.

In another embodiment, when the microphone is provided in the display device 100, the display device 100 may autonomously receive the voice command of the user.

The NLP client 50 of the display device 100 may transmit the received voice command to the NLP sever 10.

The NLP client 50 of the display device 100 may receive intention analysis result information including an intention analysis result of the voice command from the NLP sever 10.

When the intention analysis result information is an intention to give the detailed information of a person who appears on a scene which is currently being viewed, since the detailed information of the person is not stored in the storage 140 (that is, in the EPG information), the NLP client 50 of the display device 100 may determine that the function according to the intention is not able to be performed.

Thereafter, the display device 100 may capture the image 800 of the program at a point of time when the voice command is received, and transmit the captured image to an auto content recognition (ACR) server.

The ACR server may extract an object (person) included in the image using the captured image and acquire information on the extracted object.

Information on the object may include information for identifying the object.

The display device 100 may receive information for identifying the person from the ACR server. The information for identifying the person may include the name of the person.

The display device 100 may transmit an information request message including the name of the person to the search server 30. The search server 30 may transmit, to the display device, the detailed information of the person received from the display device 100.

According to another embodiment of the present disclosure, the ACR server may be the search server 30. The ACR server may transmit, to the display device 100, the detailed information of the person including works, in which the person acts, and the history of the person, in addition to the information for identifying the person.

The display device 100 may display, on the display 180, the detailed information 1010 of the person received from the search server 30.

Next, FIG. 11 will be described.

Figure 11:
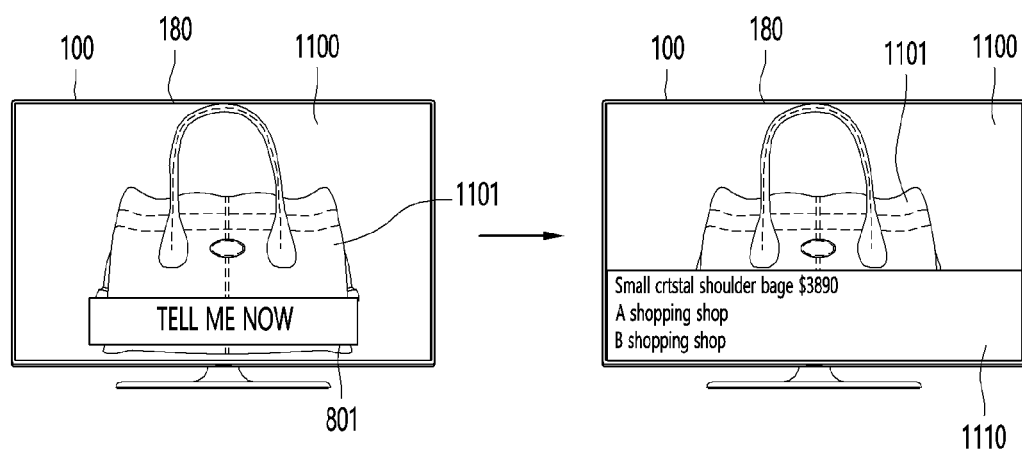
Figure 11:
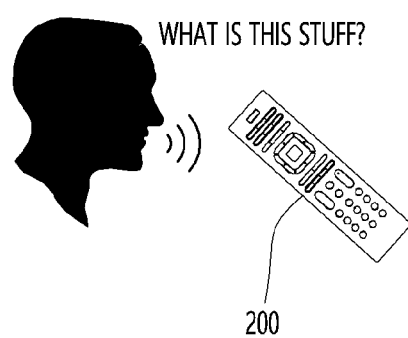

FIG. 11 is a view illustrating an example of providing search information using a search server through intention analysis of a voice command according to another embodiment of the present disclosure.

Referring to FIG. 11, the display device 100 may display a content image 1100 on the display 180. The display 180 may further display a popup window 801 for guiding the request of the voice command of the user in the voice recognition mode.

The content image 1100 may include an object indicating a bag 1101.

The microphone provided in the remote control device 200 may receive a voice command <Who is this stuff?> of the user.

The wireless communication interface 220 of the remote control device 200 may transmit the voice command to the wireless communication interface 173 of the display device 100.

In another embodiment, when the microphone is provided in the display device 100, the display device 100 may autonomously receive the voice command of the user.

The NLP client 50 of the display device 100 may transmit the received voice command to the NLP sever 10.

The NLP client 50 of the display device 100 may receive intention analysis result information indicating an intention analysis result of the voice command from the NLP sever 10.

When the intention analysis result information is an intention to give the detailed information of the stuff which appears on a scene which is currently being viewed, since the detailed information of the stuff is not stored in the storage 140 (that is, in the EPG information), the NLP client 50 of the display device 100 may determine that the function according to the intention is not able to be performed.

Thereafter, the display device 100 may capture the image 800 of the program at a point of time when the voice command is received, and transmit the captured image to an ACR server. In this case, the ACR server may be the search server 30.

The ACR server may extract a bag 1101 included in the image using the captured image and acquire information on the extracted bag 1101. The information on the bag 1101 may include the model name of the bag, the price of the bag, the name of a shopping mall where the bag can be purchased.

The display device 100 may receive information on the bag included in the image from the ACR server.

The display device 100 may display the received information 1110 on the bag to the display 180.

The user may confirm the information on the object included in the image using only a simple voice command without a complicated process, while viewing the content image.

Next, FIG. 12 will be described.

Figure 12:
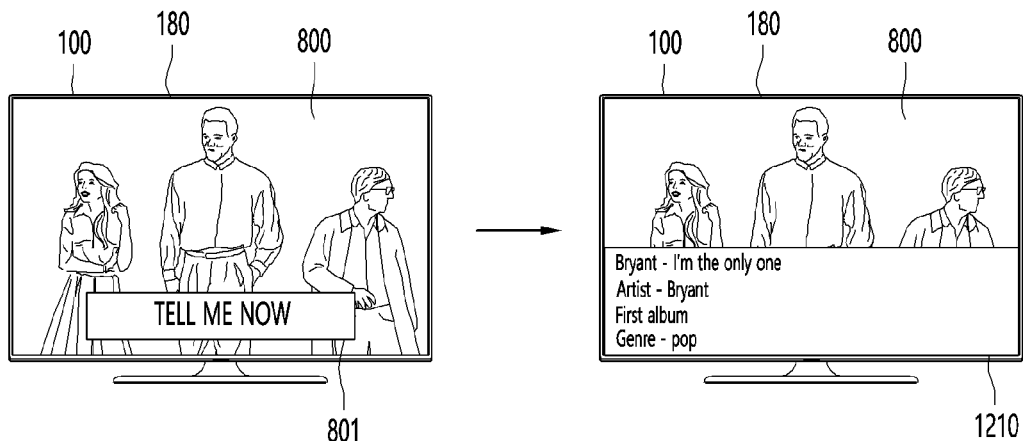
Figure 12:
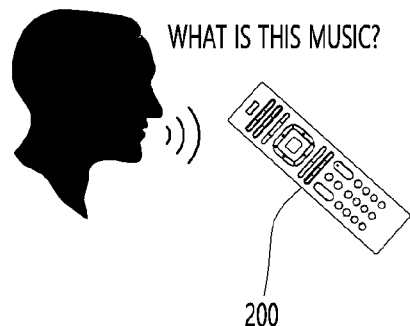

FIG. 12 is a view illustrating an example of providing search information using a search server through intention analysis of a voice command according to another embodiment of the present disclosure.

Referring to FIG. 12, the display device 100 may display a program image 800 on the display 180. the display 180 may further display a popup window 801 for guiding the request of the voice command of the user in the voice recognition mode.

The microphone provided in the remote control device 200 may receive a voice command <What is this music?> of the user.

The wireless communication interface 220 of the remote control device 200 may transmit the voice command to the wireless communication interface 173 of the display device 100.

In another embodiment, when the microphone is provided in the display device 100, the display device 100 may autonomously receive the voice command of the user.

The NLP client 50 of the display device 100 may transmit the received voice command to the NLP sever 10.

The NLP client 50 of the display device 100 may receive intention analysis result information including an intention analysis result of the voice command from the NLP sever 10.

When the intention analysis result information includes an intention to give the detailed information of music which is output along with the currently viewed image, since the detailed information of the music is not stored in the storage 140 (that is, in the EPG information), the NLP client 50 of the display device 100 may determine that the function according to the intention is not able to be performed.

At the same time, the display device 100 may receive, through the microphone, audio which is being output through the audio output interface 185. The display device 100 may transmit the received audio to a sound source analysis server.

The sound source analysis server may acquire the title of the music based on the received audio and transmit the acquired title of the music to the display device 100.

The display device 100 may transmit the received title of the music to the search server 30. The search server 30 may search for the detailed information of the music using the received title of the music and transmit the searched detailed information of the music to the display device 100.

The detailed information of the music may include one or more of the singer of the music, the composer of the music, the album of the music and the genre of the music.

The display device 100 may display the received detailed information 1210 of the music on the display 180.

According to the embodiment of the present disclosure, the user may easily confirm the detailed information of the music which is output while the program image is viewed, using only a simple voice command.

Next, FIG. 13 will be described.

Figure 13:
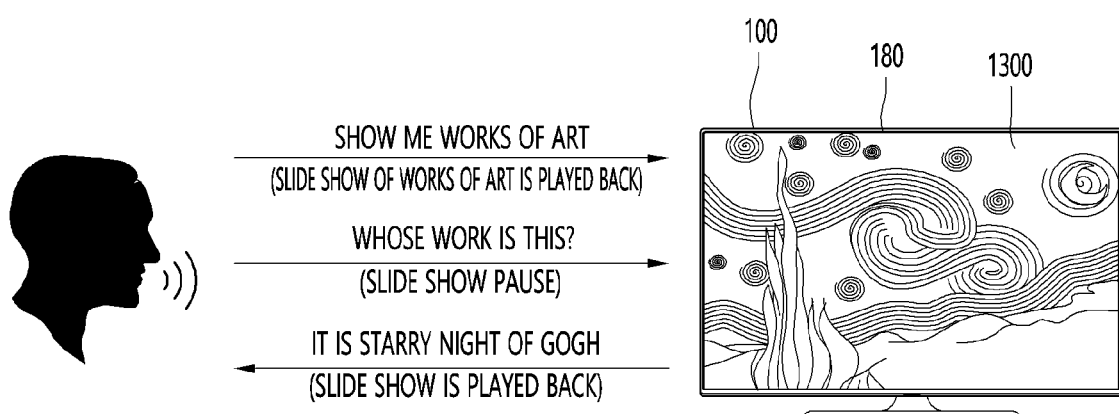

FIG. 13 is a view illustrating an example of providing search information using a search server through intention analysis of a voice command according to another embodiment of the present disclosure.

In particular, FIG. 13 is a view illustrating a scenario which may occur when a user views a still image (or an image).

Referring to FIG. 13, the display device 100 may receive a first voice command <Show me a work of art> of a user.

The display device 100 may display an image 1300 indicating the work of art stored in the storage 140 on the display 180 in response to the first voice command.

Thereafter, the display device 100 may receive a second voice command <Whose work is this?>. The display device 100 may transmit the voice data corresponding to the second voice command to the NLP sever 10.

Meanwhile, when images are output in the form of a slide show, the display device 100 may pause playback of the slide show before the second voice command is transmitted to the NLP sever 10.

The NLP sever 10 may generate intention analysis result information of the second voice command based on the voice data corresponding to the second voice command and transmit the generated intention analysis result information to the display device 100.

Upon determining that content included in the intention analysis result information is an intention to give information on the work of the image 1300, the display device 100 may transmit an information request message for requesting the information on the work to the search server 30.

The display device 100 may include the information request message in the image 1300 and transmit the information to the search server 30.

The search server 30 may search for the detailed information of the work based on the information request message and transmit the searched detailed information to the display device 100.

The display device 100 may audibly output the received detailed information <It is the starry night of Gogh> of the work through the audio output unit 185. The detailed information of the work may include the artist of the work and the name of the work.

Thereafter, the display device 100 may resume the playback of the paused slide show.

According to an embodiment of the present disclosure, the above-described method may be embodied as a processor readable code on a medium in which a program is recorded. Examples of processor-readable media include ROM, RAM, CD-ROM, magnetic tape, floppy disk, optical data storage device, and the like, and may be implemented in the form of a carrier wave (for example, transmission over the Internet).

The display device described above may not be limitedly applied to the configuration and method of the above-described embodiments, but the embodiments may be configured by selectively combining all or some of the embodiments so that various modifications may be made.

What is claimed is:

1. A display device comprising:
a display configured to display a broadcasting program;
a network interface configured to perform communication with a server system; and
a controller configured to:
receive a voice command of a user while displaying the broadcasting program,
transmit, to the server system, the received voice command,
receive, from the server system, analysis result information of the voice command related to turning off the display device,
acquire a time information of the broadcasting program based on the received analysis result information of the voice command related to turning off the display device,
display, on the display, a time indication to turn off the display device based on the acquired time information of the broadcasting program currently displayed, wherein the time indication is a remaining time of the broadcasting program currently displayed, and
turn off the display device based on the time information.

2. The display device of claim 1, further comprising a microphone configured to receive the voice command of the user.

3. The display device of claim 1, further comprising a wireless communication interface configured to receive the voice command of the user from a remote controller.

4. The display device of claim 1, wherein based on a function corresponding to the analysis result information being determined as a function which cannot be autonomously performed by the display device, the controller is further configured to transmit, to the server system, a second data corresponding to the analysis result information.

5. The display device of claim 4, wherein the controller transmits, to the server system, the second data with a third data.

6. The display device of claim 5, wherein the third data includes a title of the broadcasting program.

7. The display device of claim 4, wherein the controller transmits, to the server system, the second data with a third data output being from the display device.

8. The display device of claim 7, wherein the third data output being from the display device is a captured image of the broadcasting program or a sound source.

9. The display device of claim 1, further comprising:
a tuner configured to receive a broadcasting signal corresponding to the broadcasting program.

10. The display device of claim 4, wherein the server system includes a first server and a second server, the controller transmits the received voice command to the first server and transmits the second data to the second server.

11. The display device of claim 4, wherein the controller receives search information based on the second data from the server system and displays the search information on the display.

12. The display device of claim 1, wherein the controller transmits, to the server system, information on the broadcast program currently being displayed along with the received voice command.

13. A display device comprising:
a display configured to display a broadcasting program;
a network interface configured to perform communication with a server system; and
a controller configured to:
receive a voice command of a user while displaying the broadcasting program,
transmit, to the server system, the received voice command and information on the broadcasting program currently being viewed,
receive, from the server system, analysis result information of the voice command related to turning off the display device based on the voice command and the information,
acquire, based on the analysis result information, time information of the broadcasting program,
display, on the display, a time indication that the display device is turned off based on the acquired time information of the broadcasting program currently displayed, wherein the time indication is a remaining time of the broadcasting program currently displayed, and
turn off the display device based on the time information.

14. A system comprising:
a display device configured to:
display, on a display, a broadcasting program,
receive a voice command of a user while displaying the broadcasting program, and
transmit, to a server system, the voice command and information on the broadcasting program currently being viewed; and
the server system configured to:
obtain analysis result information of the voice command related to turning off the display device based on the voice command and information, and
transmit the analysis result information of the voice command related to turning off the display device to the display device,
wherein the display device is further configured to:
receive, from the server system, the transmitted analysis result information of the voice command related to turning off the display device,
acquire time information of the broadcasting program based on the received analysis result information related to turning off the display device,
display, on the display, a time indication that the display device is turned off based on the acquired time information of the broadcasting program currently displayed, wherein the time indication is a remaining time of the broadcasting program currently displayed, and
turn off the display device based on the time information.

* * * * *